(12) United States Patent
Bellis, Jr. et al.

(10) Patent No.: US 6,598,791 B2
(45) Date of Patent: Jul. 29, 2003

(54) SELF-CHECKOUT SYSTEM AND METHOD INCLUDING ITEM BUFFER FOR ITEM SECURITY VERIFICATION

(75) Inventors: Donald Bellis, Jr., Canandaigua, NY (US); Barry Keys, Batavia, NY (US); James Behrens, Macedon, NY (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/766,392

(22) Filed: Jan. 19, 2001

(65) Prior Publication Data

US 2002/0096564 A1 Jul. 25, 2002

(51) Int. Cl.[7] .............................................. G06K 15/00
(52) U.S. Cl. ............. 235/383; 235/462.14; 235/462.15; 705/23
(58) Field of Search ................................. 235/383, 437, 235/380, 375, 385, 462.14, 462.15; 705/16, 21, 23; 186/61, 52, 60

(56) References Cited

U.S. PATENT DOCUMENTS

| | | | | |
|---|---|---|---|---|
| 3,836,755 A | * | 9/1974 | Ehrat | 235/383 |
| 4,071,740 A | * | 1/1978 | Gogulski | 235/431 |
| 4,676,343 A | | 6/1987 | Humble et al. | 186/61 |
| 4,766,296 A | | 8/1988 | Barth | 235/383 |
| 4,779,706 A | * | 10/1988 | Mergenthaler | 186/61 |
| 4,792,018 A | | 12/1988 | Humble et al. | 186/61 |
| 4,909,356 A | * | 3/1990 | Rimondi et al. | 186/61 |
| 4,932,485 A | * | 6/1990 | Mori | 177/245 |
| 4,940,116 A | | 7/1990 | O'Connor et al. | 186/61 |
| 4,959,530 A | | 9/1990 | O'Connor | 235/383 |
| 4,964,053 A | * | 10/1990 | Humble | 186/61 |
| 5,083,638 A | * | 1/1992 | Schneider | 186/61 |
| 5,125,465 A | * | 6/1992 | Schneider | 177/25.15 |
| 5,168,961 A | * | 12/1992 | Schneider | 186/52 |
| 5,267,314 A | | 11/1993 | Stambler | 380/24 |
| 5,311,969 A | | 5/1994 | Dickover et al. | 186/61 |
| 5,340,970 A | | 8/1994 | Wolfe, Jr. et al. | 235/383 |
| 5,426,282 A | * | 6/1995 | Humble | 235/383 |
| 5,494,136 A | * | 2/1996 | Humble | 186/61 |
| 5,497,853 A | * | 3/1996 | Collins et al. | 186/61 |
| 5,524,073 A | | 6/1996 | Stambler | 380/24 |
| 5,525,786 A | * | 6/1996 | Dumont | 235/462.14 |
| 5,540,301 A | * | 7/1996 | Dumont | 186/61 |
| 5,543,607 A | * | 8/1996 | Watanabe et al. | 235/383 |
| 5,560,450 A | * | 10/1996 | Kouno | 186/61 |
| 5,594,228 A | * | 1/1997 | Swartz et al. | 235/383 |
| 5,609,223 A | * | 3/1997 | Iizaka et al. | 186/61 |
| 5,641,039 A | | 6/1997 | Dumont | 186/61 |
| 5,646,998 A | | 7/1997 | Stambler | 380/25 |
| 5,662,190 A | * | 9/1997 | Abe | 186/61 |
| 5,664,110 A | | 9/1997 | Green et al. | 705/26 |

(List continued on next page.)

FOREIGN PATENT DOCUMENTS

| | | | |
|---|---|---|---|
| EP | 0994447 A2 | * | 4/2000 |
| GB | 2193000 A | * | 1/1988 |
| JP | 2001-184563 A | * | 7/2001 |

Primary Examiner—Karl D. Frech
Assistant Examiner—Uyen-Chau N. Le
(74) Attorney, Agent, or Firm—Stoel Rives LLP (57) ABSTRACT

A self-checkout system for a retail establishment that allows a customer to checkout multiple items having respective identification codes, the system includes a computer having memory with a buffer, an identification code reader coupled to the computer for determining the identifications of the items by the identification codes, a security verification mechanism coupled to the computer for verifying that the items actually being checked out from the retail establishment are the same as those identified by the identification code reader, and whereby the computer is adapted to store identification information of multiple items obtained by the identification code reader in the buffer before verifying that the items actually being checked out from the retail establishment are the same as those identified by the identification code reader.

40 Claims, 5 Drawing Sheets

U.S. PATENT DOCUMENTS

| | | | |
|---|---|---|---|
| 5,747,784 A | 5/1998 | Walter et al. | 235/383 |
| 5,752,582 A | 5/1998 | Hayward | 186/61 |
| 5,793,302 A | 8/1998 | Stambler | 340/825.34 |
| 5,877,485 A * | 3/1999 | Swartz | 186/61 |
| 5,898,383 A * | 4/1999 | Forsythe | 340/5.91 |
| 5,900,614 A | 5/1999 | Nakakawaji et al. | 235/462.14 |
| 5,923,735 A | 7/1999 | Swartz et al. | 379/93.12 |
| 5,936,541 A | 8/1999 | Stambler | 340/825.33 |
| 5,952,642 A * | 9/1999 | Lutz | 235/383 |
| 5,965,861 A * | 10/1999 | Addy et al. | 186/61 |
| 5,967,264 A | 10/1999 | Lutz et al. | 186/61 |
| 5,974,148 A | 10/1999 | Stambler | 380/25 |
| 5,979,757 A | 11/1999 | Tracy et al. | 235/383 |
| 5,992,570 A * | 11/1999 | Walter et al. | 186/36 |
| 6,032,128 A * | 2/2000 | Morrison et al. | 705/23 |
| 6,056,087 A * | 5/2000 | Addy et al. | 16/66 |
| 6,080,938 A | 6/2000 | Lutz | 177/25.15 |
| 6,092,725 A * | 7/2000 | Swartz et al. | 235/380 |
| 6,155,486 A * | 12/2000 | Lutz | 186/61 |
| 6,167,381 A * | 12/2000 | Swaine et al. | 186/36 |
| 6,189,790 B1 * | 2/2001 | Walter | 235/383 |
| 6,354,498 B1 * | 3/2002 | Lutz | 186/52 |
| 6,363,355 B1 * | 3/2002 | Morrison et al. | 186/59 |

\* cited by examiner

SELF-CHECKOUT SYSTEM AND METHOD INCLUDING ITEM BUFFER FOR ITEM SECURITY VERIFICATION

BACKGROUND OF THE INVENTION

The field of the present invention relates to self-checkout systems and methods.

In an effort to reduce a customer's waiting time in a checkout line of a retail establishment, manual price keying of each item being purchased has been replaced by the process of scanning a bar code of each item to obtain price information. Bar code readers are used in commercial and retail environments to accomplish this scanning process. In a retail checkout transaction, the consumer presents the items to be purchased to the cashier at a checkout register, and the cashier scans each item. In addition, there may be an ID check if the customer is purchasing an age-restricted item such as, but not by way of limitation, beer, wine, liquor, tobacco, cigarettes, or certain solvents. The transaction is completed once all the items have been scanned, all the coupons have been accepted, the total costs have been calculated, and the consumer has paid for the items. Even though scanning all the items at a checkout register takes less time than manually entering each item description into the computer, the sequential presentation to a cashier of each individual purchase can still take a long time and create long checkout lines. This time-consuming process can cause bottlenecks at the checkout stations, reducing throughput, making customers unhappy, and affecting the financial condition of a retail establishment.

A new way of conducting a checkout transaction is by self-checkout. In a self-checkout system, each customer, rather than the cashier, scans the bar codes of the items being purchased. After selecting all the shopping items, a customer brings all the items to a stationary self-checkout system. A self-checkout system typically comprises a scanner/scale for reading the product/coupon bar codes and weighing the sold-by-weight items, a weighing scale for item confirmation/security, and a checkout terminal for generating the final bill and accepting payment.

Once at the self-checkout system, the customer undergoes the following sequential process for each item being purchased: 1) the customer scans the bar code of the item being purchased, and 2) the customer puts the item on the weighing scale so that it can be verified that the weight of the item on the scale matches stored weight information for the item scanned.

After all the purchases have been individually scanned and weight verified, any relevant coupons are also scanned. The customer requests the final bill by selecting an appropriate input on the checkout terminal. In response to the customer's request, the total purchase price is displayed on the terminal screen, and the bill is printed out. The customer tenders payment to the checkout terminal. The terminal can accept payments by any standard payments method. Once the bill has been paid and the receipt issued, the self-checkout transaction is finished, and the customer can leave the store.

A problem with this type of self-checkout system and method of self-checkout is that it requires a separate item security verification step, e.g., weight verification step, for each item scan. The present inventors have recognized that, for multiple items, the separate step of weight verifying for each item scan is time-consuming, and can lead to the aforementioned problems of bottlenecks at the checkout stations, reduced throughput, unhappy customers, and negative impact on the financial condition of the establishment.

SUMMARY OF THE INVENTION

Thus, the present inventors have recognized that by allowing more than one item to be scanned, read, or input before weight verifying or performing another physical characteristic security verification procedure for the item(s) reduces the duration of the checkout process.

The present invention in one aspect is directed to a checkout system for an establishment that allows a customer to checkout multiple items having respective identification codes. In a preferred construction, the system includes a computer having memory with a buffer, an identification code reader coupled to the computer for determining the identifications of the items by the identification codes, a security verification mechanism coupled to the computer for verifying that the items actually being checked out from the establishment are the same as those identified by the identification code reader, and whereby the computer is adapted to store identification information of multiple items obtained by the identification code reader in the buffer before verifying that the items actually being checked out from the establishment are the same as those identified by the identification code reader. In a preferred implementation of the above, the system is a self-checkout system for a retail establishment.

An additional aspect of the present invention involves a method of self-checkout. The method includes consecutively reading the bar codes of multiple grocery store items to be checked out and storing identification information for the multiple grocery store items in a buffer, and then performing a security verification step including verifying for security purposes that the weight of the items actually being checked out from the grocery store match the weight associated with the stored identification information for the items.

Other and further objects, features, aspects, and advantages of the present inventions will become better understood with the following detailed description of the accompanying drawings.

BRIEF DESCRIPTION OF THE DRAWINGS

The following drawings illustrate both the design and utility of preferred embodiments of the invention. In the drawings, similar elements are referred to by common reference numbers.

DETAILED DESCRIPTION OF THE PREFERRED EMBODIMENTS

Figure 1:
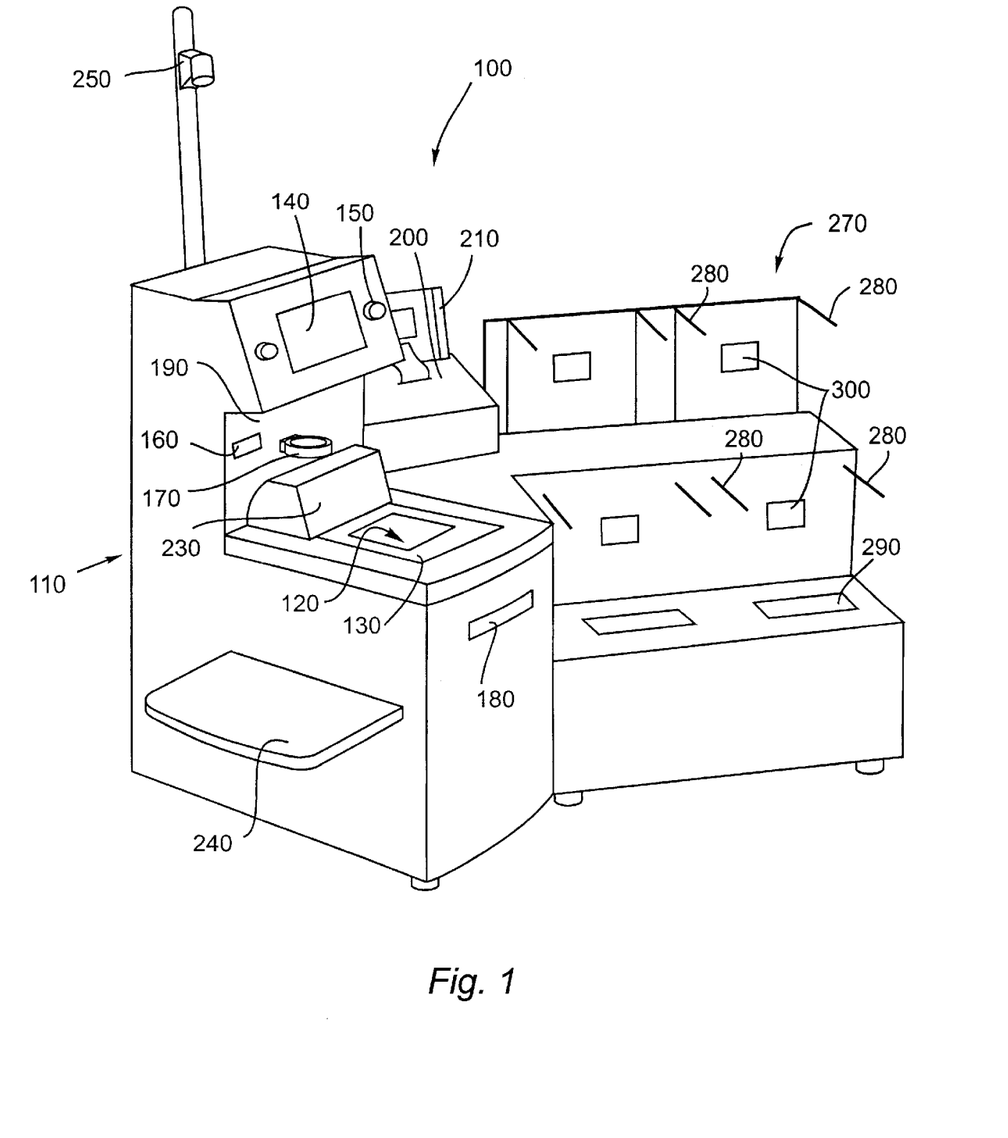
FIG. 1 is perspective view of an embodiment of a self-checkout system.

With reference to FIG. 1, a self-checkout system 100 constructed in accordance with preferred embodiment will now be described. The self-checkout system 100 will be described in conjunction with checking out or purchasing grocery store items in a grocery store or supermarket environment. However, the self-checkout system 100 may be used in retail or commercial environments other than a grocery store such as, but not by way of limitation, convenience stores such as 7-Eleven™, drug stores such as Walgreens™, or super drug stores such as F & M™, and mass merchants such as WAL-MART™, TARGET™, etc. The self-checkout system 100 may also be used in environments or establishments that are not commercial or retail, e.g., a library.

With reference to FIG. 1, the self-checkout system 100 may include a system housing 110 that houses or carries an identification code reader 120 (e.g., bar code scanner), a weighing scale 130, a touch screen LCD display 140, speaker(s) 150, a bill acceptor 160, a coin dispenser 170, a bill dispenser 180, a receipt printer integrated with a check reader/writer (MICR) 200, an Electronic Funds Transfer ("EFT")/magnetic strip card reader 210, and a electronic article surveillance deactivator 230. A folding shelf 240 may be pivotally coupled to the housing 110 for temporary holding items to be purchased. A surveillance camera (e.g., CCD camera) 250 is preferably used to capture an image of or constantly view each of the items to be purchased and/or other self-checkout activity. The system housing 110 preferably also houses a check-out terminal or computer 260 (FIG. 3) that, in order to control the system 100, may be coupled to the identification code reader 120, the weighing scale 130, the touch screen LCD display 140, the speakers 150, the bill acceptor 160, the coin dispenser 170, the bill dispenser 180, the coupon reader 190, the receipt printer 200, the Electronic Funds Transfer ("EFT")/magnetic strip card reader 210, the check reader/writer (MICR) 220, the electronic article surveillance deactivator 230 and monitor(s) 300, and the surveillance camera 250 in a well-known manner.

A bagging station 270, which may be adjacent to, connected to, integral with, or separate from the system housing 100, may include multiple bag support arms 280 extending therefrom for holding shopping bags. The bagging station 270 may include one or more scales 290 located beneath the support arms 280 and coupled to the checkout terminal 260. The one or more scales 290 weigh checked-out items placed in the shopping bags to verify by comparing an item's actual weight with stored values (including measurement tolerances) representative of the weight of the item scanned or input into the system 100. The bagging station 270 may also include one or more electronic article surveillance ("EAS") monitors 300 coupled to the self-checkout computer 260 for detecting the presence of active EAS tags among the items on the bagging station.

Figure 2:
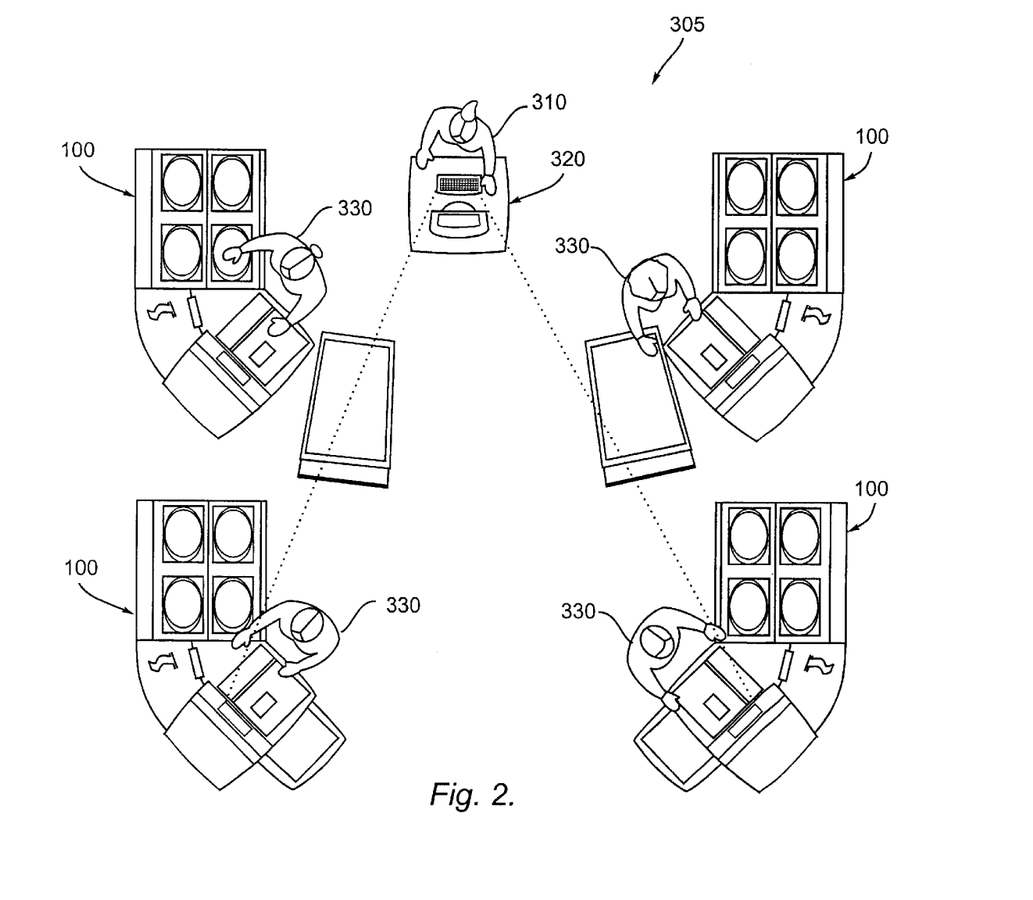
FIG. 2 is a top plan view of multiple self-checkout systems in an exemplary retail environment.

With reference to FIG. 2, the self-checkout system 100 may be one of many self-checkout systems 100 in an establishment 305 such as a grocery store. As discussed above, the system 100 may be used in establishments 305 other than a grocery store. Preferably, an attendant 310 resides at an attendant station 320 positioned to strategically oversee customers 330 and self-checkout activity at the one or more self-checkout systems 100. The attendant station 320 may include an attendant terminal or computer, a monitor, and one or more input and output devices. In a preferred embodiment, one attendant 310 and attendant station 320 are provided for every four self-checkout systems 100. However, in alternative embodiments, the number of self-checkout systems 100, attendant stations 320, and/or ratio of self-checkout systems 100 to attendants 310/attendant stations 320 may vary.

Figure 3:
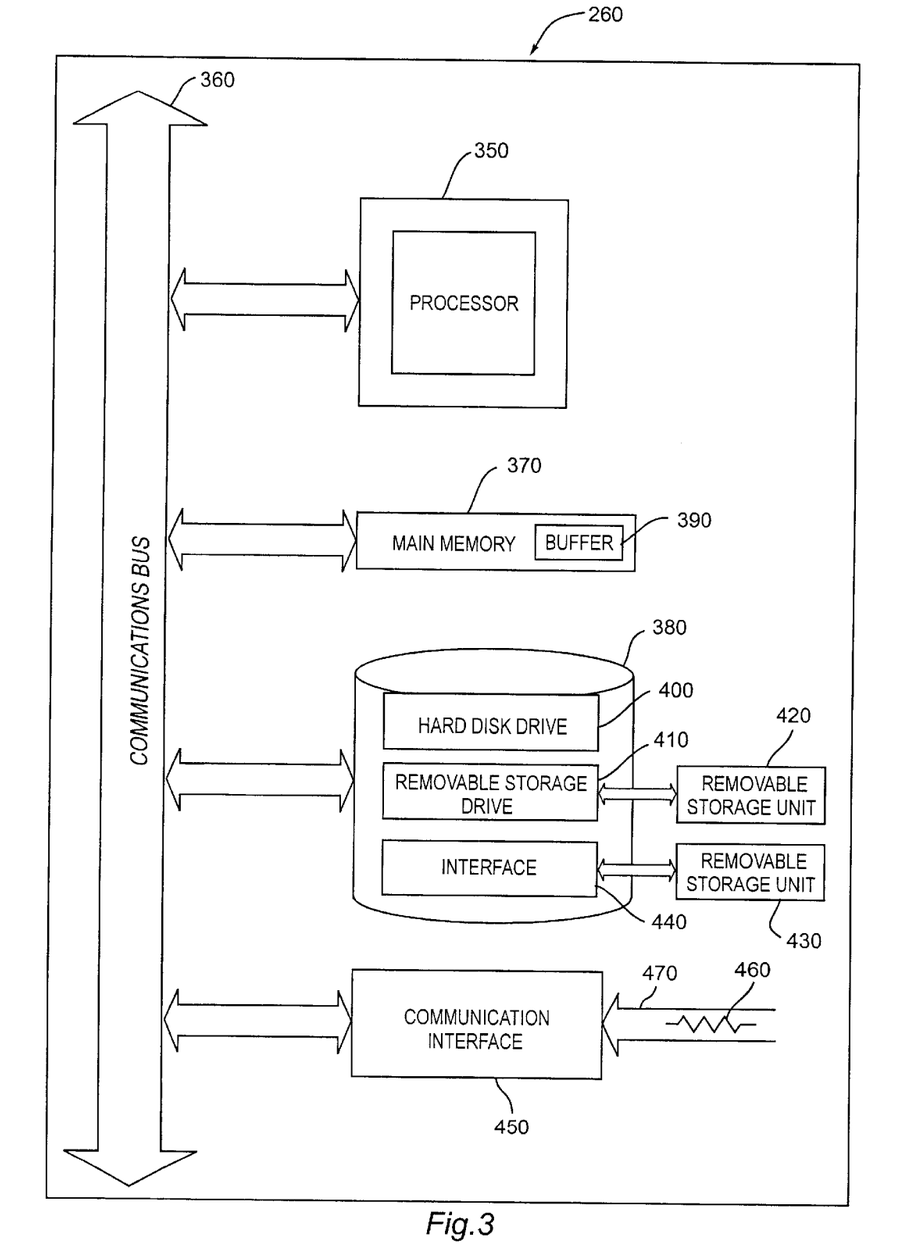
FIG. 3 is a schematic illustration of an embodiment of a self-checkout terminal of the self-checkout system illustrated in FIG. 1.

With reference to FIG. 3, an embodiment of a checkout terminal or computer 260 that may be used with the self-checkout system 100 will now be described. The system may be implemented using other computer systems and/or computer architectures. The checkout computer system 260 may include hardware, software or a combination thereof and may be implemented in one or more computer systems or other processing systems.

The checkout computer 260 may include one or more processors such as processor 350. The processor 350 is connected to a communication bus 360. The checkout computer 260 also includes a main memory 370, preferably random access memory (RAM), and can also include a secondary memory 380. The main memory 370 preferably includes an item buffer 390 for temporarily holding identification information for multiple store items before security verification of whether the weight(s) of the store items actually being checked out match the weights and tolerances associated with the identification information stored in the buffer 390. As used herein, "match" or "matches" means the same as or within a predetermined or measured and stored tolerance range. Tolerance values may be predetermined for all items or for groups of items, i.e., classes. Tolerance values may also be empirically determined for individual items.

The secondary memory 380 may include, for example, a hard disk drive 400 and/or a removable storage drive 410, representing a floppy disk drive, a magnetic tape drive, an optical disk drive, etc. The removable storage drive 410 reads from and/or writes to a removable storage unit 420 in a well-known manner. Removable storage unit 420, represents a floppy disk, magnetic tape, optical disk, etc. which is read by and/or written to by removable storage drive 410. As will be appreciated, the removable storage unit 420 includes a computer usable storage medium having stored therein computer software and/or data.

In alternative embodiments, secondary memory 380 may include other similar means for allowing computer programs, other instructions, or data to be loaded into computer system 260. Such means can include, for example, a removable storage unit 430 and an interface 440. Examples of such can include a program cartridge and cartridge interface (such as that found in video game devices), a removable memory chip (such as an EPROM, or PROM) and associated socket, and other removable storage units 430 and interfaces 440 which allow software and data to be transferred from the removable storage unit 430 to computer system 260.

The secondary memory 380 may include one or more databases such as a Weight Look-Up database ("WLU") that includes SKU values and weight information for each item in the grocery store. Although the database is described as a Weight Look-up database, the database may be a Look-up database for any physical characteristic (not limited to weight). The Physical Characteristic database may reside on one or more different or additional computers such as an attendant terminal at the attendant station 320, a central store server, or a remote server outside of the store.

The computer 260 may also include a communications interface 450. The communications interface 450 allows software and data to be transferred between the computer 260 and external devices. Examples of communications interfaces 450 include, but not by way of limitation, a modem, a network interface (such as an Ethernet card), a communications port, a PCMCIA slot and card, etc. Software and data transferred via the communications interface 450 are in the form of signals 460 which can be electronic, electromagnetic, optical or other signals 460 capable of being transmitted or received by communications interface 450. These signals 460 are provided to communications interface 450 via a channel 470. This channel 470 carries signals 460 and can be implemented using wire or cable, fiber optics, a phone line, a cellular phone link, an RF link or other communication channels 470.

In this document, the terms "computer program medium" and "computer usable medium" are used to generally refer to media such as removable storage unit 420, 430, a hard disk installed in hard disk drive 400, and signals 460. These computer program products are means for providing software and data to computer system 260.

Computer programs (also called computer control logic) may be stored in main memory 370 and/or secondary memory 380. Computer programs can also be received via communications interface 450. Such computer programs, when executed, enable the computer system 260 to perform the features of the system as discussed herein. In particular, the computer programs, when executed, enable the processor 350 to perform the features of the system. Accordingly, such computer programs represent controllers of the computer system 260.

In an embodiment where the system is implemented using software, the software may be stored in a computer program product and loaded into computer system 260 using removable storage drive 410, hard drive 400, or communications interface 450. The control logic (software), when executed by the processor 350, causes the processor 350 to perform the functions of the system as described herein.

In another embodiment, the system is implemented primarily in hardware using, for example, hardware components such as application specific integrated circuits (ASICs), a set of wired logic circuits, or an old-fashioned hardwired circuit of transistors, capacitors, and resistors.

In yet another embodiment, the system is implemented using a combination of both hardware and software.

Figure 4:
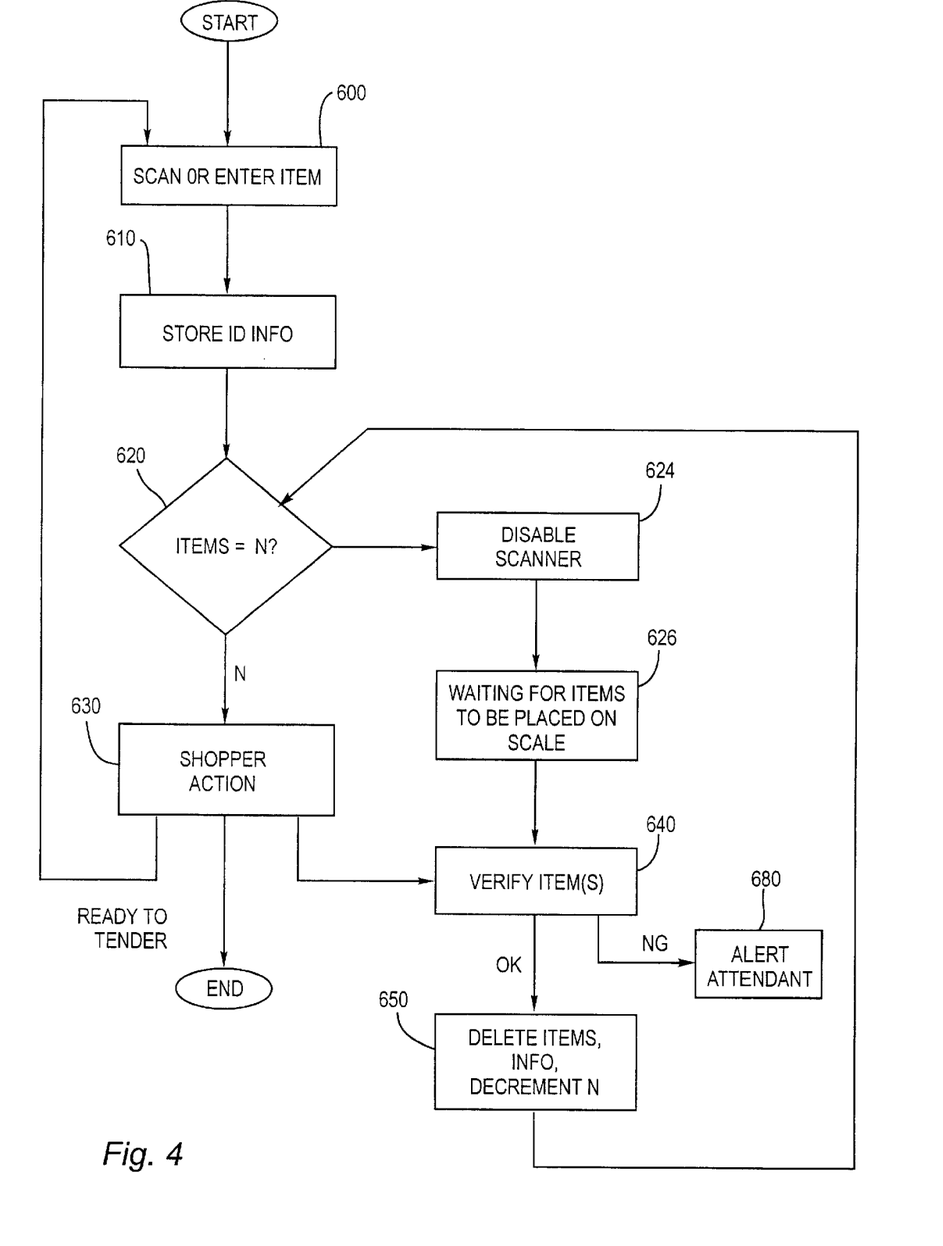
FIG. 4 is a flow chart of an embodiment of a check-out method in accordance with the invention

With reference to FIGS. 1, 2, and 4, the self-checkout system 100 will now be described in use. After selecting all the shopping items, the customer 330 brings all the items to one of the self-checkout systems 100. The display 140 preferably displays instructions that serve to guide the customer 330 through a checkout procedure. The display 140 is preferably a known touch-screen display that can generate data signals when certain areas of the screen are touched by the customer 330. The display 140 may instruct the customer 330 to begin by scanning multiple items or by interaction with the touch-screen display 140, e.g., there may be a "start" button in the user interface for transaction initiation. At step 600, the customer 330 scans the identification code, e.g., bar code, of each item being purchased with the identification code reader 120 or otherwise inputs the identification code of each item.

In a preferred embodiment, the identification code reader 120 is a fixed, multi-orientation bar code scanner and the bar code of each item is scanned or read by placing the item over the reader 120, bar code side down or back. Although not shown, the scanner may include a light source such as a laser, a rotating mirror driven by a motor, and a mirror array. In operation, a laser beam reflects off the rotating mirror and mirror array to produce a pattern of scanning light beams. As the product identification code on an item is passed over the scanner, the scanning light beams scatter off the code and are returned to the scanner where they are collected and detected. The reflected light is then analyzed electronically in order to determine whether the reflected light contains a valid product identification code pattern. If a valid code pattern is present, identification information such as, but not by way of limitation, the SKU value may be determined and temporarily stored in the item buffer 390 (FIG. 3). The system 100 may acknowledge successful identification of a valid code pattern by an audible beep or other sign.

Examples of product identification codes that may be read include bar codes such as the Universal Product Code (UPC), industrial symbols, alphanumeric characters, or other indicia associated with an item to be purchased.

A preferred fixed scanner for a high-volume location such as a grocery store checkout is a multi-scan window scanner such as the Magellan® scanner available from PSC Inc. of Eugene, Oreg.

In an alternative embodiment, the reader 120 is a handheld scanner or other type of portable reader that may be moved to read the identification code of the item in a manner similar to that described above.

Multiple items are preferably read, scanned, or input at step 600 and temporarily stored at step 610 in the item buffer 390 before a security verification process occurs. Price information may be retrieved from an appropriate database and displayed as soon as an item is identified, allowing the shopper to view the pricing before the item is placed on a security scale. The items temporarily stored in the item buffer 390 may be described as being "in hand" because they are in a state between when a customer 330 identifies an item to the system 100 and when the customer 330 places the item onto the security scale 290. Software on the computer 260 may create a virtual holding area that contains all the items that are "in hand". Information for the item that may be stored in the item buffer 390 may include identification information such as the SKU value for the item and weight information retrieved from the Weight Look-Up table (WLU).

The number of items N that may be scanned and temporarily stored in the item buffer 390 before a security verification process occurs may be a fixed system configuration setting, e.g., two, three, four, etc., or may be a variable amount system configuration setting that may be adjusted by the customer 330, the attendant 310, a store manager, other authorized person, or by internally or externally generated signal. The variable amount may be adjusted at the system 100, the attendant station 320, a central store computer, a remote computer, or other suitable input device.

At step 620, the computer 260 may determine whether a number of consecutive identification code readings is equal to the system configuration setting number N. If the number of consecutive readings is less than the number N, the process proceeds to a shopper action step 622. The shopper action step 622 may include scanning additional items and storing respective identification information at step 610. If all of the items have been input, read, or scanned, then the customer 330 may proceed to tendering payment and completing the checkout process or the customer 330 may proceed to a security verification process 640. If the number of consecutive readings is equal to N, the scanner or reader 120 may be disabled at step 624 so that no more items may be read, the system 100 may wait, at step 626, for items to be placed on the scale(s) 290, and then the process may proceed to the security verification process 640.

After identification information for 1 to N items have been read and stored in the item buffer 390, the security verification process may be performed to verify that the items actually being checked out or removed from the store are the same items as those being read or scanned into the system 100. Otherwise, for example, a customer 330 may, for example, scan an inexpensive item or items, e.g., beans, multiple times while removing a more expensive item or items, e.g., steaks.

In a preferred embodiment, the security verification mechanism includes one or more of the scales 290 and the security verification process is a weighing process. Although two scales 290 are shown at each self-checkout system 100, in alternative embodiments, a different number of scales may be at each self checkout system 100, e.g., 1, 3, 4, etc. Also, the scale(s) 290 may have a different configuration that that shown in FIGS. 1 and 2. For example, instead of bagging and weighing items on top of the scale 290, items may be bagged and weighed with a bag hanging from the scale.

In alternative embodiments, an electronic scale and weighing process may be replaced or supplemented with other security verification mechanisms and procedures. For example, an image or images of an item from the surveillance camera 250 may be used by the attendant 310 to verify that the items being checked out or removed match those that are being scanned. The surveillance camera 250 or other image capturing device could be used to capture dimensional information for each item being checked out and this dimensional information could be compared to dimensional information associated with the SKU values for the items scanned for security verification purposes.

After scanning, reading, or inputting multiple items, one or more of the items are placed on the electronic scale(s) 290 and weighed at step 640. Placing one or more of the items on the electronic scale(s) 290 may include placing one or more of the items item in a bag on the electronic scale(s) 290 so that bagging and weighing is done in one step. A weight for the item(s) is determined by the difference between the weight on the scale(s) 290 before the item(s) was placed on the scale(s) 290 and the weight on the scale(s) 290 after the item(s) was placed on the scale(s) 290, i.e., the weight differential.

The weight differential may be compared to weight information for each, the sum of all, or the sum of any combination of the items identified and stored in the item buffer 390 to determine if the weight of the item(s) on the scale(s) 290, i.e., the items actually being checked out from the store, match the weight information of one or more of the items scanned and stored in the item buffer 390. The weight information for each item scanned and stored may already be stored in the memory buffer 390 or may be retrieved from the Weight Look-Up table (WLU).

Software on the computer 260 may also allow the customer 330 to weigh items for security verification in a different order that the items were scanned or identified. As discussed above, software on the computer 330 may create a virtual holding area that contains all the items that are "in hand", i.e., in the item buffer 390. The system 100 detects the weight differential for any item placed on the scale 290, regardless of the order in which the item was scanned or identified. The weight differential is compared to the weight values for each item held "in hand" to determine which item was placed on the scale 290. Thus, the items may be weighed in a different order than the order the items were scanned and stored.

A customer 330 may scan a first item and a second item, one with each hand, and then set one or both of them on the electronic scale(s) 290 for security weight verification. In a preferred embodiment, the system would permit both items to be placed on the scale(s) 290 for weight verification. Allowing a customer to grab two items, one with each hand, and scan both items and place both items on the scale(s) 290 at the same time for a single weight verification greatly improves the speed of the self-checkout process. During the weight verification process, the computer 260 may compare the weight differential on the scale(s) 290 with weight information retrieved for the first item scanned, the second item scanned, or the combination of the first and second item.

The customer 330 may also scan more than two items, and then set one or more of the multiple items on the electronic scale(s) 290 for security weight verification. The computer system 260 may compare the weight differential with weight information retrieved for each individual item scanned, the sum of all the items scanned, or the sum of any combination of the items scanned.

If a matching weight value is found for an item, a group of items, or all the items, then at step 650, all the information for the item(s) may be removed or cleared from the item buffer 390 because verification for the item has been completed. The number of items may be decremented by the number of items that were verified or cleared from the buffer 390. Further weight verification procedures will not include comparison with cleared items from the buffer 390.

The scanning process and the security verification process may be asynchronous until the number items is equal to N. While item(s) are being scanned, read, or input, the item(s) may be simultaneously security verified as long as the number of items is less than N. Control may pass from step 650 to step 620 after the number of items that were verified or cleared from the buffer 390 are decremented from the total number of items for continued scanning.

If no matching weight value is found for an item, a group of items, or all the items, then at step 680, an attendant 310 may be alerted. The customer 330 may be instructed to re-weigh the scanned item(s) on the scale 130, which is preferably integrated with the reader 120. The attendant 310 may be requested to verify that the item(s) on the scale 130 is truly what the customer 330 scanned. If the attendant 310 verifies that the item(s) scanned is the item on the scale 130 or security scale 290, this new weight may be accepted into the weight look-up database or stored to be considered for inclusion in a target weight calculation. At this point, the security verification process may be complete or the attendant 310 may ask the customer 330 to put the item(s) on the security bagging scale 290. The attendant 310 may want to override the security scale violation instead of letting the customer 330 go through the re-weigh activity described above. The attendant may do that by touching an "override" portion of the display 140 so that the customer 330 does not have to remove and weigh the item(s).

In another embodiment, the system 100 may "remember" the weights for all items during a transaction for identifying and/or generating a "reduced" list of possible items that the shopper may remove from the bag scale area after security verification. For example, the "reduced" list may include a list of all items scanned or input, with those security verified in a different color than those that have not been security verified. Alternatively, those items that have been security verified may be removed from the list with the items that have not been security verified remaining on the list. This enables the shopper in identifying the items that may be removed from the shopping area and the items that have not been cleared. This may also assist the customer 330 in identifying items to be voided.

Preferably, as the weight of each item or multiple items is verified, along with information related to the item "in hand" or stored in the item buffer 390 being cleared or removed from the item buffer 390, the system 100 may acknowledge security verification of an item or items with an audible beep or other sign. After security verification, the system 100 may communicate with the retail establishment's controller software program, e.g., IBM SA, for pricing calculations, e.g., pricing subtotal, tax, credit, total. Results from the pricing calculations may be displayed on the display 140 and/or broadcasted via the speakers 150.

The items being checked out may include a magnetic tag, RFID tag, electronic tag or other tag to prevent the items from being removed from the retail establishment 305 without properly checking the items out. If an item is properly scanned, the electronic article surveillance deactivator 230 may be actuated, causing a deactivating coil to be energized and the tag on the item to be deactivated or removed. If an item was not properly scanned, the tag remains on the item and is sensed by the electronic article surveillance monitor 300. The customer 330 may then be prompted to re-scan the item. If scanning is successful, the tag will be deactivated or removed.

After all the items have been scanned and weight verified, the customer 330 may present coupons for scanning by the identification code reader 120. The customer then tenders payment to the checkout system 100. The self-checkout system 100 may accept cash payment via the bill acceptor 160, credit card or cash card payment via the Electronic Funds Transfer ("EFT")/magnetic strip card reader 210, or check payment via the check reader/writer (MICR) 220. The system 100 may also accept Electronic Bank Transfer ("EBT"), voucher, manual checks, semi-automatic checks, debit card, and WIC. If the customer 330 makes a cash payment, the system 100 may dispense change via the bill dispenser 180 and coin dispenser 170. After the customer 330 tenders payment, a bill is printed out by the receipt printer 200. The self-checkout transaction is finished, and the customer 330 may leave the store 305.

Thus, the self-checkout system 100 allows multiple items to be scanned before performing a security verification procedure such as weighing the items, allows the security verification procedure to be performed asynchronous with the item identification procedure, and allows, after multiple items have been scanned, the items to be security verified in any order or in combination.

Figure 5A:
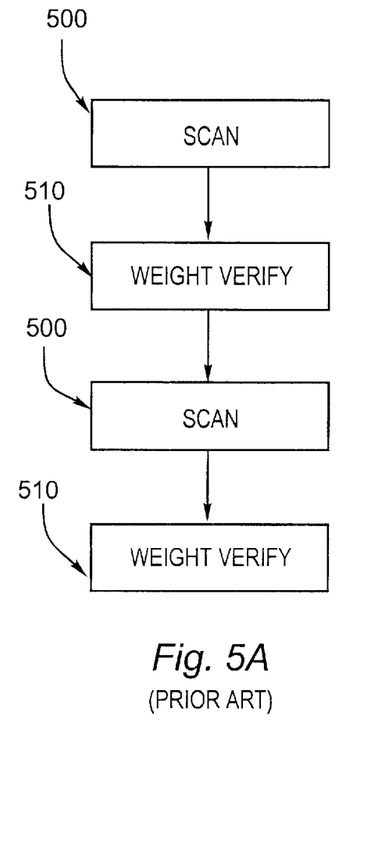
FIG. 5A is a flow chart of a prior art check-out method.
Figure 5B:
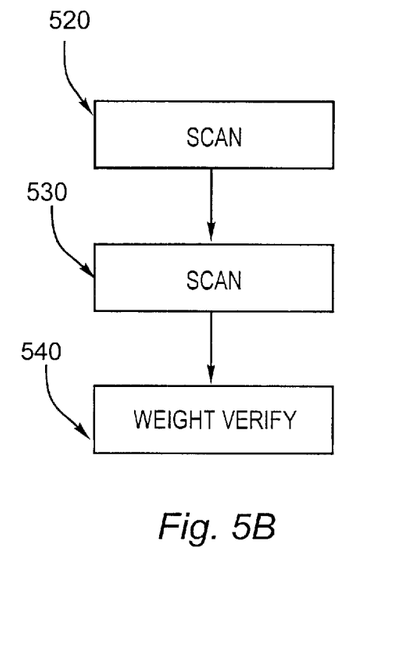
FIG. 5B is a flow chart of an embodiment of a general check-out method in accordance with the invention.

The main difference between the self-checkout process of the past and the embodiment of the self-checkout process described herein is illustrated in FIGS. 5A and 5B.

In the past, as illustrated by the flow chart of FIG. 5A, each item to be purchased was sequentially scanned at step 500, and weight verified at step 510 before the next item could be processed. This scan 500, weight verify 510 procedure was repeated for each item to be purchased at the self-checkout system. A new item could not be scanned into the system until the weight verification procedure was completed for the previously scanned item. Performing the security verification procedure after each item scan is time-consuming, leading to the aforementioned problems of bottlenecks at the checkout stations, reduced throughput, unhappy customers, and negative impact on the financial condition of the retail establishment.

With reference to FIG. 5B, in contrast to the prior art self-checkout process, an embodiment of the self-checkout process includes scanning at step 520 a first item, scanning at step 530 one or more additional items, and weight verifying at step 540 one or more of the items. By allowing more than one item to be scanned into the system 100 at a time before performing a security verification procedure, throughput an usability are improved and the aforementioned problems at self-checkout stations are reduced.

Although the present invention has been described above in the context of certain preferred embodiments, it is to be understood that various modifications may be made to those embodiments, and various equivalents may be substituted, without departing from the spirit or scope of the invention.

What we claim is:

1. A checkout system for an establishment that allows a customer to checkout multiple items having respective identification codes, comprising:

a computer having memory, the memory having a buffer;

an identification code reader coupled to the computer for reading the identification codes;

a security verification mechanism coupled to the computer for verifying that the items actually being checked out from the establishment are the same as those identified by the identification code reader; and whereby the computer is adapted to store identification information of multiple items obtained by said identification code reader in said buffer before verifying that the items actually being checked out from the establishment are the same as those identified by the identification code reader.

2. The checkout system of claim 1, wherein the checkout system is a self-checkout system.

3. The checkout system of claim 1, wherein the establishment is a retail establishment.

4. The checkout system of claim 3, wherein the retail establishment comprises a grocery store.

5. The checkout system of claim 1, wherein the identification code reader comprises a fixed bar code scanner.

6. The checkout system of claim 1, wherein the identification code reader comprises a portable scanning device.

7. The checkout system of claim 6, wherein the identification code reader comprises a hand-held scanner.

8. The checkout system of claim 1, wherein the security verification mechanism comprises a physical characteristic measuring device.

9. The checkout system of claim 1, wherein the security verification mechanism comprises an electronic scale.

10. A self-checkout system for a retail establishment that allows a customer to checkout multiple items having respective identification codes, comprising:

a computer;

means coupled to the computer for reading the identification codes;

security means coupled to the computer for verifying that the items actually being checked out from the retail establishment match those identified by the identification code reading means; and whereby the computer includes means for storing identification information of multiple items obtained by said identification code reading means in a buffer before verifying that the items actually being checked out from the retail establishment are the same as those identified by the identification code reading means.

11. A self-checkout system for a grocery store that allows a customer to checkout multiple grocery store items having respective bar codes, comprising:

a checkout terminal having memory, the memory having a buffer;

a bar code scanner coupled to the checkout terminal for reading the bar codes for determining the identifications of the grocery store items;

an electronic scale coupled to the checkout terminal for verifying that the weight of the grocery store items actually being checked out from the grocery store match the weight of the grocery store items identified by the bar code scanner; and whereby the checkout terminal is adapted to store identification information of multiple grocery store items obtained by said bar code scanner in said buffer before verifying with said electronic scale that the weight of the grocery store items actually being checked out from the grocery store matches the weight of the grocery store items identified by the bar code scanner.

12. A method according to claim 11 wherein the step of verifying comprises placing first and second items on a scale, determining an incremental weight increase caused by placing the first and second items thereon, and verifying that the incremental weight increase matches the sum of the weight associated with the stored identification information for the first item and the second item.

13. A method according to claim 12 further comprising placing the first and second items on the scale at the same time.

14. A method of checkout using a check out system for an establishment that allows a customer to checkout multiple items having respective identification codes, the method comprising the steps of:

reading the identification codes of multiple items to be checked out;

storing identification information for the multiple items in a buffer; and verifying that one or more physical characteristics of the items actually being checked from the establishment match one or more respective physical characteristics associated with the stored identification information for the multiple items after reading and storing identification codes for multiple items.

15. The method of claim 14, wherein the method is a method of self-checkout using a self-checkout system.

16. The method of claim 14, wherein the establishment is a retail establishment.

17. The method of claim 16, wherein the retail establishment comprises a grocery store.

18. The method of claim 14, wherein the step of reading the identification codes of multiple items to be checked out includes reading the bar codes of multiple items to be checked out with a bar code scanner.

19. The method of claim 14, wherein the step of verifying that one or more characteristics of the items actually being checked out from the retail establishment match one or more respective characteristics associated with the stored identification information for the multiple items includes weighing one or more of the items actually being checked out from the retail establishment with an electronic scale and verifying that the weight of the one or more items match the weight of the one or more items read.

20. The method of claim 14, wherein the step of reading the identification codes of multiple items to be checked out includes holding a pair of items, one in each hand, and consecutively scanning a bar code on each item without a security verification step therebetween.

21. The method of claim 14, wherein the step of verifying includes verifying, in a different order than an order that the multiple items are read, that one or more physical characteristics of the items actually being checked from the retail establishment match one or more respective physical characteristics associated with the stored identification information for the multiple items.

22. The method of claim 14, wherein the step of verifying includes verifying, in a different order than an order that the multiple items are read, that the weight of the items actually being checked from the retail establishment match the weights associated with the stored identification information for the multiple items.

23. A method of self-checkout using a self-check out system for a grocery store that allows a customer to checkout multiple grocery store items having respective bar codes, the method comprising the steps of:

reading the bar codes of multiple grocery store items to be checked out;

storing identification information for the multiple grocery store items in a buffer;

verifying for security purposes that the weight of the items actually being checked out from the grocery store match the weights associated with the stored identification information for the multiple items after reading the bar codes and storing identification information for multiple grocery store items.

24. A method of claim 23 further comprising verifying, in a different order than an order that the bar codes on the multiple items have been read, that the weight of the items actually being checked out match the weights associated with the stored identification information for the multiple items.

25. A method according to claim 24 further comprising placing multiple items on a scale at the same time.

26. A method of self-checkout using a self-check out system for a grocery store that allows a customer to checkout multiple grocery store items having respective bar codes, the method comprising the steps of:

reading the bar code of a first grocery store item to be checked out and storing identification information for the first grocery store item in a buffer;

before verifying for security purposes that the weight of first grocery store item matches the weight associated with the stored identification information for the first grocery store item, reading the bar code of a second grocery store item to be checked out and storing identification information for the second grocery store item in the same buffer as that used to store identification information for the first grocery store item.

27. The method of claim 26, further comprising verifying for security purposes that the weight of first grocery store item and/or the second grocery store item match the weight associated with the stored identification information for the first grocery store item and/or the second grocery store item.

28. The method of claim 26, further comprising determining a combined weight for the first and second grocery store items and verifying that the combined weight of the first and second grocery store items matches the sum of the weight associated with the stored identification information for the first grocery store item and the second grocery store item.

29. The method of claim 26, further comprising determining a weight for the second grocery store item before determining a weight of the first grocery store item and verifying that the weight of the second grocery store item matches the weight associated with the stored identification information for the second grocery store item before verifying that the weight of the first grocery store item matches the weight associated with the stored identification information for the first grocery store item.

30. The method of claim 26, further comprising the steps of placing the first and second grocery store items in a bag on a scale, determining the incremental weight increase of the bag caused by placing the first and second grocery store items therein, and verifying that the incremental weight increase matches the sum of the weight associated with the stored identification information for the first grocery store item and the second grocery store item.

31. The method of claim 26, wherein the method includes reading and verifying N grocery story items, wherein N is greater than two.

32. A method of checkout in an establishment, comprising:

reading a bar code of a first item to be checked out;

reading a bar code of a second item to be checked out prior to performing a security verification that the first item to be checked out is the same as that which had its bar code read;

performing a security verification that the first and second items to be checked out are the same as those that had their bar codes read after the bar codes of the first and second items have been read.

33. The method of claim 32, wherein said method is a method of self-checkout in a retail establishment.

34. A method of claim 32 further comprising performing security verification on the second item prior to performing security verification on the first item.

35. A method of self-checkout using a self-check out system for a grocery store that allows a customer to checkout multiple grocery store items having respective bar codes, the method comprising the steps of:

consecutively reading the bar codes of multiple grocery store items to be checked out and storing identification information for the multiple grocery store items in a buffer in a first order;

after consecutively reading the bar codes and storing identification information, verifying for security purposes that the weight of the items actually being checked out from the grocery store match the weights associated with the stored identification information for the multiple items in a second order that is different that the first order.

36. A computer program product comprising a computer readable medium having computer program logic stored therein, said computer program logic enabling the self-checkout of multiple items having respective identification codes with a self-checkout system for a retail establishment, said computer program logic comprising:

means for determining identification information of multiple items to be checked out based on said identification codes;

means for storing in a buffer identification information for multiple consecutive items identified by said determining means; and means for verifying that one or more characteristics of the items actually being checked out match one or more respective characteristics associated with the stored identification information for the multiple items after determining and storing identification information for multiple items.

37. A computer program product comprising a computer readable medium having computer program logic stored therein, said computer program logic enabling the self-checkout of multiple grocery store items having respective bar codes with a self-checkout system for a grocery store, said computer program logic comprising:

means for determining identification information of multiple grocery store items to be checked out based on said bar codes;

means for storing in a buffer identification information for the multiple consecutive grocery store items identified by said determining means; and means for verifying that the weight of the grocery store items actually being checked out match the weight associated with the stored identification information for the multiple grocery store items after determining and storing identification information for multiple grocery store items.

38. A computer program product comprising a computer readable medium having computer program logic stored therein, said computer program logic enabling the self-checkout of multiple grocery store items having respective bar codes with a self-checkout system for a grocery store, said computer program logic comprising:

means for reading the bar code of a first grocery store item to be checked out and storing identification information for the first grocery store item in a buffer;

means for reading the bar code of a second grocery store item to be checked out and storing identification information for the second grocery store item in the same buffer as that used to store identification information for the first grocery store item before verifying for security purposes that the weight of first grocery store item matches the weight associated with the stored identification information for the first grocery store item.

39. The computer program product of claim 38, further including means for verifying for security purposes that the weight of first grocery store item and/or the second grocery store item match the weight associated with the stored identification information for the first grocery store item and/or the second grocery store item.

40. A method of a self-checkout and item verification, comprising the steps of obtaining identity of a first item by scanning an optical code thereon;

before placing the first item on a weigh scale to verify its identity, obtaining identity of a second item by scanning an optical code thereon;

placing both the first item and the second item on the weigh scale;

obtaining a combined weight of the first and second items from the weigh scale;

using the combined weight of the first and second items to verify identity of both the first item and the second item.

* * * * *